(12) United States Patent
Ubeda Castellanos et al.

(10) Patent No.: US 9,961,666 B2
(45) Date of Patent: May 1, 2018

(54) MULTIPATH DETECTION

(71) Applicant: Telefonaktiebolaget LM Ericsson (publ), Stockholm (SE)

(72) Inventors: Carlos Ubeda Castellanos, Madrid (ES); Mª Josefa Vera Nadales, Malaga (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/521,661

(22) PCT Filed: Oct. 30, 2014

(86) PCT No.: PCT/EP2014/073362
§ 371 (c)(1),
(2) Date: Apr. 25, 2017

(87) PCT Pub. No.: WO2016/066204
PCT Pub. Date: May 6, 2016

(65) Prior Publication Data
US 2017/0230931 A1 Aug. 10, 2017

(51) Int. Cl.
*H04W 24/00* (2009.01)
*H04W 64/00* (2009.01)
*G01S 5/02* (2010.01)

(52) U.S. Cl.
CPC ......... *H04W 64/006* (2013.01); *G01S 5/0215* (2013.01)

(58) Field of Classification Search
CPC ..................... H04W 64/006; G01S 5/0215
(Continued)

(56) References Cited

U.S. PATENT DOCUMENTS

2004/0203864 A1   10/2004   Dibuduo
2004/0258012 A1*  12/2004   Ishii ................. H04L 47/10
                                                  370/328
(Continued)

FOREIGN PATENT DOCUMENTS

EP          1 605 725          12/2005

OTHER PUBLICATIONS

Autonomous CDMA Multipath Diversity Receiver by P. Monogioudis et al.; Centre for Satellite Engineering Research—1994 IEEE.
(Continued)

*Primary Examiner* — Nghi H Ly
(74) *Attorney, Agent, or Firm* — Sage Patent Group (57) ABSTRACT

The invention relates to a method for detecting multipath propagation in RF signals exchanged between a mobile entity (10) and different cells (31, 32) of a cellular network. The method comprises the steps of obtaining cell location information for a plurality of cells; obtaining a measurement report reported by the mobile entity (10) to the cellular network for a first cell (31) and a second cell (32) of the plurality of cells, the measurement report comprising a parameter related to a first time delay occurring for the RF signal travelling between the first cell (31) and the mobile entity (10), and a parameter related to a second time delay occurring for the RF signal travelling between the second cell (32) and the mobile entity (10). A time delay difference is calculated between the first time delay and the second time delay, and a distance difference is deduced from the time delay difference taking into account the speed of the RF signals travelling between the first cell (31) and the mobile entity (10) and between the second cell (32) and the mobile entity (10). An inter-cell distance between the first cell (31) and the second cell (32) is calculated based on the cell
(Continued)

location information for the first cell and the second cell. The inter-cell distance is compared to the distance difference, wherein the multipath propagation is detected based on the result of the comparison.

18 Claims, 9 Drawing Sheets

(58) Field of Classification Search
USPC .............................. 455/418, 421, 423, 424
See application file for complete search history.

(56) References Cited

U.S. PATENT DOCUMENTS

| | | | | |
|---|---|---|---|---|
| 2006/0092850 | A1* | 5/2006 | Neidhardt | H04L 43/0864 |
| | | | | 370/252 |
| 2011/0039574 | A1 | 2/2011 | Charbit et al. | |
| 2013/0176158 | A1* | 7/2013 | Kim | G04F 10/005 |
| | | | | 341/166 |

OTHER PUBLICATIONS

Evaluation of a Time-Delay Based Geolocation Algorithm in Real UMTS Networks by Carlos Úbeda et al.—2010 IEEE.
GNSS Multipath Detection Using Three-Frequency Signal-to-Noise Measurements by Philip R. R. Strode et al.; Original Article; Received: Sep. 22, 2014/ Accepted: Feb. 25, 2015/ Published online: Mar. 14, 2015 @ Springer-Verlag Berlin Heidelberg 2015.
3GPP TS 25.215 v12.0.0; Technical Specification; 3rd Generation Partnership Project; Technical Specification Group Radio Access Network; Physical Layer; Measurements (FDD) (Release 12)—Sep. 2014.
International Search Report for International application No. PCT/EP2014/073362—dated Jul. 6, 2015.
3GPP TS 25.111 v14.0.0; Technical Specification; 3rd Generation Partnership Project; Technical Specification Group Radio Access Network; Location Measurement Unit (LMU) performance specification; User Equipment (UE) Positioning in UTRAN (Release 14)—Mar. 2017.

* cited by examiner

MULTIPATH DETECTION

PRIORITY

This nonprovisional application is a U.S. National Stage Filing under 35 U.S.C. § 371 of International Patent Application Serial No. PCT/EP2014/073362 filed Oct. 30, 2014, and entitled "Multipath Detection."

TECHNICAL FIELD

The present invention relates to a method for detecting multipath propagation in RF signals exchanged between a mobile entity and different cells of a cellular network and to the corresponding system therefor. The invention furthermore relates to a computer program and a computer program product.

BACKGROUND

Most important wireless communication systems, such as Universal Mobile Telecommunication System (UMTS) or Long Term Evolution (LTE), have adopted asynchronous modes of operation, which means that there is no need of time-alignment between transmissions in different cells. However, there are some procedures, e.g. soft-handover in UMTS or some positioning algorithms in LTE, which require accurate timing information, so the 3rd Generation Partnership Project (3GPP) has standardized the report of time delay measurements.

Operators take advantage of this type of measurements to perform planning and optimization tasks based on positioned RF data, so a high degree of reliability is essential for accurate results. Nevertheless, any wireless communication suffers from multipath propagation, which includes the reception of two or more replicas of the transmit signal due to reflections in the atmosphere, terrain, buildings, etc. These reflections make the signal propagate longer than expected according to the line of sight, which may distort the reported time delay measurements. This effect is especially relevant in dense urban scenarios.

Multipath is intrinsic to wireless propagation and it especially affects positioning algorithms. A method for identifying and filtering multipath in Global Positioning Systems, GPS, based on signal-to-noise measurements is known from P. Strode, P. Groves, "GNSS multipath detection using three-frequency signal-to-noise measurements", UCL Department of Civil, Environment and Geomatic Engineering. In the field of mobile communications, all cellular network measurements such as a $T_m$ parameter defined in 3GPP TS 25.215 or a propagation delay (PD) are used in positioning algorithms, but are also very sensitive to multipath propagation. The $T_m$ parameter defined in 3GPP TS 25.215 represents the subframe offset between a Primary Common Control Physical Channel (P-CCPCH) of a cell in a cellular network being measured and its existing Dedicated Physical Channel (DPCH) connection. The user equipment (UE) reports $T_m$ measurements to acquire the required synchronization for soft-handover when certain events are triggered, e.g. a cell becomes better than a threshold. This information is included in the Radio Resource Control (RRC) measurement reports which are collected at an operation support system (OSS) and can be used by way of example in positioning methods based on the Observed Time Difference of Arrival (OTDOA).

However, a need exists to further improve the detection of multipath propagation.

SUMMARY

This need is met by the features of the independent claims. Additional features are described in the dependent claims.

According to a first aspect a method is provided for detecting multipath propagation in RF signals exchanged between the mobile entity and different cells of a cellular network. The method comprises the step of obtaining cell location information for a plurality of cells. Furthermore, a measurement report reported by the mobile entity to the cellular network is obtained for a first cell and a second cell of the plurality of cells, wherein the measurement report comprises a parameter related to a first time delay occurring for the RF signal traveling between the first cell and the mobile entity, and a parameter related to a second time delay occurring for the RF signal traveling between the second cell and the mobile entity. A time delay difference is calculated between the first time delay and the second time delay. Additionally, a distance difference is calculated from the time delay difference taking into account the speed of the RF signals traveling between the first cell and the mobile entity and between the second cell and the mobile entity. Furthermore, an inter-cell distance is calculated between the first cell and the second cell based on the cell location information for the first cell and the second cell. The inter-cell distance is compared to the distance difference and the multipath propagation is then detected based on the result of the comparison.

Based on the first time delay reported for the first cell and on the second time delay reported for the second cell, a time delay difference can be calculated and this time delay difference can then be converted into a distance difference using the speed of the RF signals. Thus, a distance difference for the signal exchanged between a mobile entity and a first cell and between the mobile entity and the second cell is known. The method then uses the inter-cell distance between the first cell and the second cell and from the comparison of the inter-cell distance to the distance difference it can be deduced whether multipath propagation is present in the signal exchange between the mobile entity and the two cells. By way of example if an absolute value of the distance difference is smaller or equal than the inter-cell distance, one might conclude that no multipath propagation is present. If, however, it is determined that the absolute value of the distance difference is larger than the inter-cell distance, it can be concluded that the path of the RF signal from the first cell or second cell to the mobile entity is larger than a path that can be explained based on the inter-cell distance. Thus, a multipath propagation is present when the absolute value of the distance difference is larger than the inter-cell distance.

One possibility to determine whether a multipath is present in the signal path between the mobile entity and the first cell or in the signal path between the mobile entity and the second cell is the use of an algebraic sign of the distance difference. By way of example if the distance difference is calculated by subtracting a second path, i.e. a path from the second cell to the mobile entity from a first path, i.e. the path between the mobile entity and the first cell, and if the difference is positive and greater than the inter-cell distance, it can be deduced that the path propagation from the first cell is longer than the path propagation from the second cell, so that the multipath is probably present in the first path. If the difference is negative and greater than the inter-cell distance, meaning that the second path is larger than the first path, one may deduce that the path propagation is longer from the second cell to the mobile entity.

The invention furthermore relates to the corresponding system configured to detect multipath propagation in RF signals, the system comprising a receiver configured to receive the cell location information for the plurality of cells and configured to receive the measurement report reported by the mobile entity to the cellular network for the first cell and the second cell including the parameter related to the first time delay, and the parameter related to the second time delay. A processing unit of the system is configured to calculate the time delay difference between the first time delay and the second time delay and to calculate the distance difference from the time delay difference using the speed of the RF signals. The processing unit is further adapted to calculate an inter-cell distance between the first cell and the second cell based on the cell location information and to compare the inter-cell distance to the distance difference. The processing unit can then detect the multipath propagation based on the result of the comparison. The multipath propagation can be detected as discussed above by comparing the absolute value of the distance difference and the inter-cell distance and by taking into account the algebraic sign of the distance difference.

According to another aspect a computer program is provided comprising program code to be executed by at least one processing unit of the system of the cellular network, wherein execution of the program causes the at least one processing unit to perform inter alia the above-discussed method. Furthermore, a computer program product comprising program code to be executed by the at least one processing unit of the system is provided, wherein the execution of the program causes the at least one processing unit to perform the above-discussed steps.

Details of embodiments of the invention will become apparent from the following detailed description of embodiments with reference to the accompanying drawings.

DETAILED DESCRIPTION OF EMBODIMENTS

In the following concepts in accordance with exemplary embodiments of the invention will be explained in more detail and with reference to the accompanying drawings. The illustrated embodiments relate to concepts for detecting multipath propagation in RF signals. The embodiments specifically refer to UMTS nomenclature; however, the invention can be used in any wireless cellular network in which a mobile entity transmits measurement reports to the network including a time delay information depending on the signal travel time between the corresponding cell and the mobile entity.

The invention uses time delay measurements to detect multipath, wherein the detected multipath can be used to strengthen positioning algorithms, to improve troubleshooting or to help in RF optimization algorithms. The system of the invention can be defined as a module or system which analyzes inter alia OSS information processed by a data gateway and identifies potential multipath which can then be used by NDO tools for improving positioning algorithms.

In one embodiment $T_m$ values reported in RRC measurement reports and collected at the OSS are used together with cell coordinates which may be obtained from configuration management (CM) data which can also be stored at the OSS. These input data are then used to calculate an inter-site or inter-cell distance ISD and the RTDs (Relative Time Difference) between the transmissions of the measured cells. The RTDs can either be obtained from a local measurement unit (LMU) or may be estimated.

The method uses an estimation of how far the reported $T_m$ measurements fall from a safe region with a low probability of multipath, which is centered in the RTD implemented by the inter-cell distance as described in further detail below. The proposed method is a versatile solution that can be easily adapted to different applications such as the detection of unreliable PD measurements, filtering for OTDOA positioning, identification of areas with high multipath, etc. It is possible to only use standardized reports, so that there is no need of activating any new feature or investing in extra data storage space.

Figure 1:
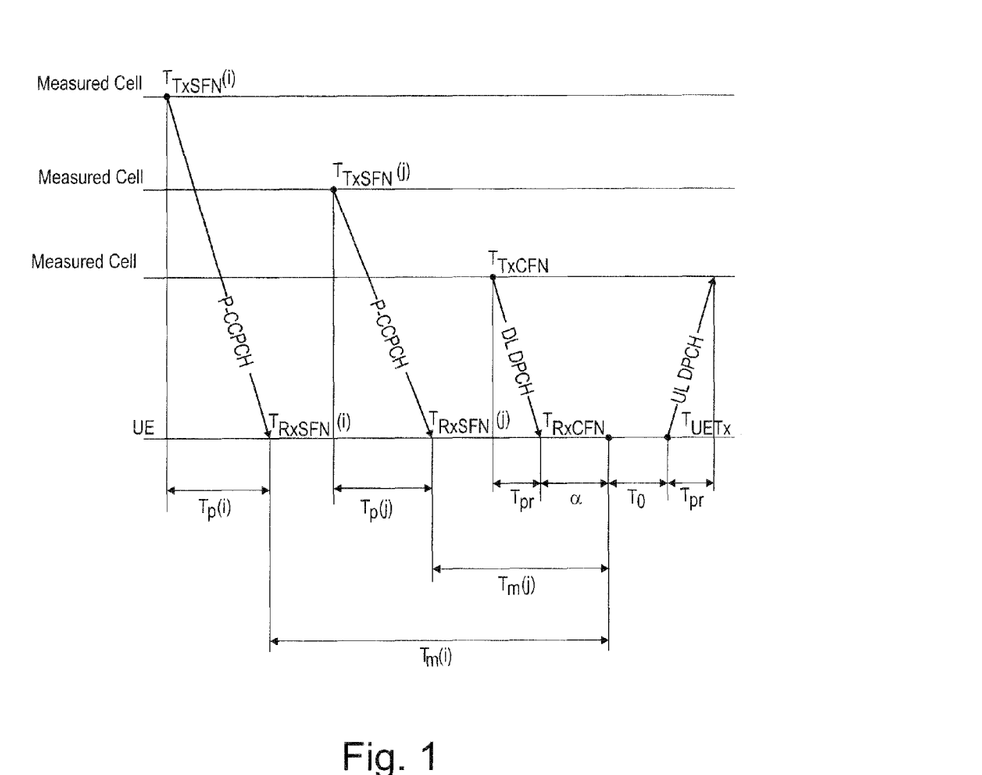
FIG. 1 schematically illustrates a diagram of a radio synchronization timing between a mobile entity and different cells of a cellular network.
Figure 3:
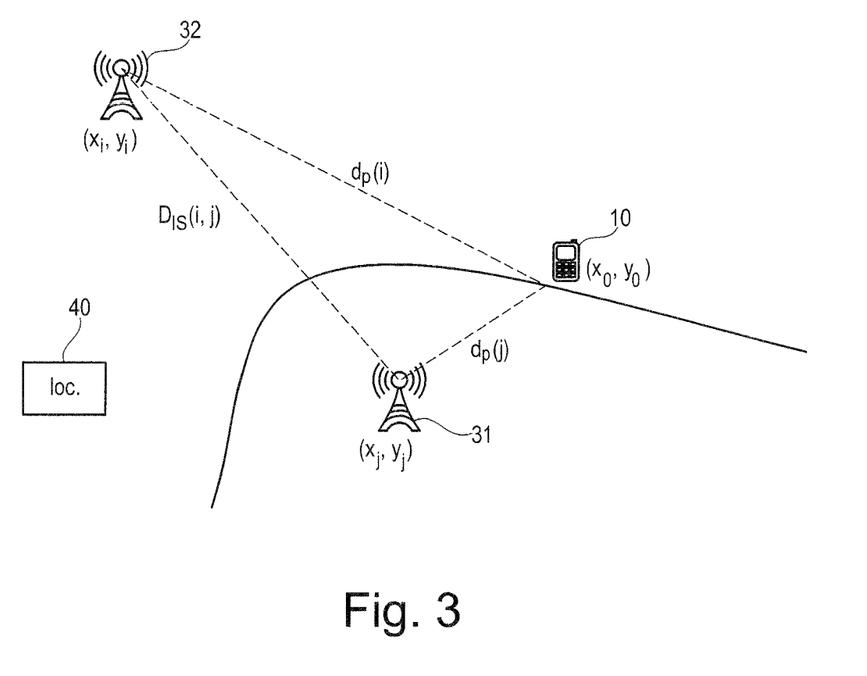
FIG. 3 schematically illustrates a geometrical representation of the location of the cells and the mobile entity and the related inter-cell distance and distance difference.
Figure 4:
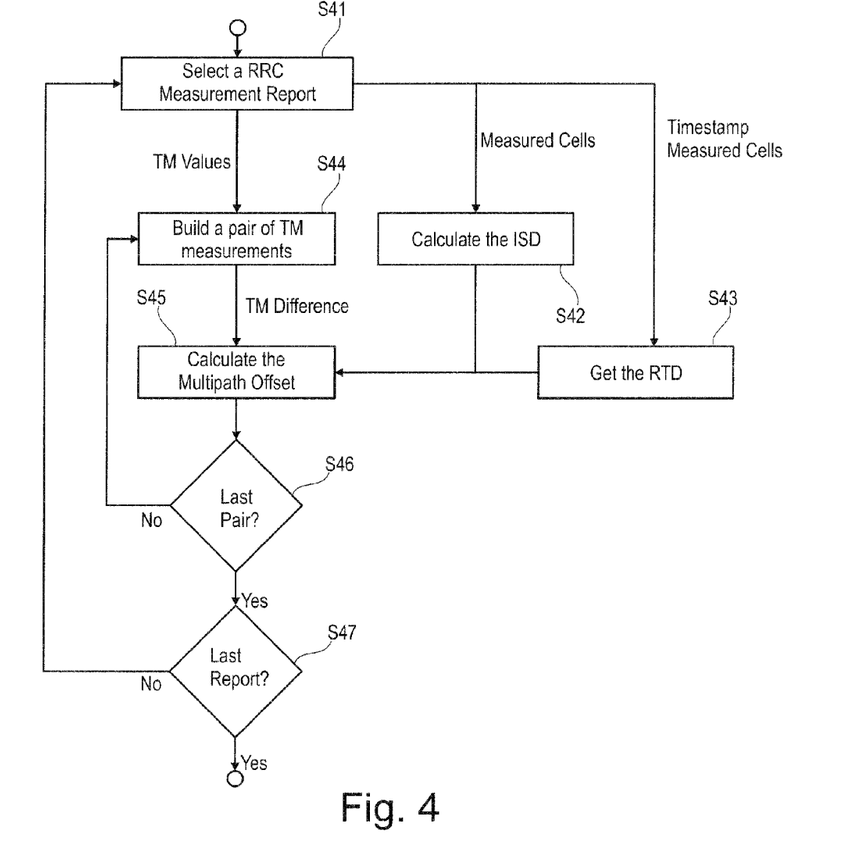
FIG. 4 schematically illustrates a flowchart comprising the steps how multipath detection is carried out in different measurement reports.

The timing relationship involved in the use of the $T_m$ parameter is discussed in further detail with reference to FIG. 1, wherein the scenario on which the timing relationship of FIG. 1 is based can also be explained with reference to FIG. 3 in which a user equipment, e.g. a mobile entity 10, reports $T_m$ measurements to acquire the required synchronization for soft-handover when certain events are triggered, e.g. a cell becomes better than a threshold. Such information is included in the Radio Resource Control Measurement Reports, which are commonly collected at the OSS. $T_{TxSFN}$(i) represents the P-CCPCH transmit time for cell i measured by a location measurement unit (LMU), such as the location measurement unit 40 shown in FIG. 3. The P-CCPCH carries, among other information, the system frame number (SFN) from neighboring cells. The SFN information is used for synchronization purposes when a communication is set up between a cell and a mobile entity. In the same way $T_{TxSFN}$(j) represents the P-CCPCH transmit time for cell j. Similarly, $T_{TxCFN}$ represents the DL DPCH, which is related to the connection frame number (CFN). $T_{RxSFN}$(i) represents the time at the beginning of the neighboring cell i P-CCPCH frame received most recently in time before the time instant $T_{UETx}-T_0$, $T_0$ being a time constant. $T_{UETx}-T_0$ is usually known as DL DPCH$_{nom}$. T$_{RxSFN}$(j) represents the same time for cell j. T$_{UETx}$ represents the time when the UE transmits an UL DPCH (an Uplink Dedicated Physical Channel). With continued reference to FIG. 1, T$_p$(i) represents the one-way propagation delay from the neighboring cell i to the mobile entity and T$_p$(j) represents the one-way propagation delay from the neighboring cell j to the mobile entity. Furthermore, T$_{pr}$ represents the one-way propagation delay from the mobile entity to the reference or serving cell. T$_0$ represents the nominal difference between the first received DPCH finger and T$_{UETx}$ at the mobile entity. T$_0$ may be a constant of e.g. 1024 chips and a represents the first received downlink DPCH finger relative to DL DPCH$_{nom}$.

The T$_m$ parameter (in chips) is a standardized time delay measurement and is defined by 3GPP TS 25.215 as follows:

$$T_m = (T_{UETx} - T_0) - T_{RxSFN} \qquad (1)$$

The T$_m$ parameter can range from 0 to 38,399 chips with a resolution of 1 chip, i.e. 0.26 μs. It is a modular magnitude, so that modular arithmetic rules should be considered. As can be deduced from FIG. 1, the propagation time in chips can be related to the T$_m$ parameter as follows:

$$T_{UETx} - T_{TxSFN} = T_p + T_m + T_0 \qquad (2)$$

The propagation time of the measured cell, T$_p$, can be associated with a propagation distance $d_p = \rho \cdot T_p$, where ρ is the speed of light normalized at chip level, which approximately corresponds to 78 m/chip, meaning that ρ=300 m/μs. When time measures are expressed in chips, e.g. T$_m$=20 chips, this can be converted into a distance measured in meters by 78 m/chip×20 chips=1065 m. In FIG. 1 as discussed above T$_{pr}$ is the propagation time of the reference cell and a is the first received downlink PDCH finger relative to T$_{UETx}$−T$_0$. Considering that T$_{UETx}$ is unknown but constant for all measured cells included in an RRC measurement report, relative values can be considered. When the above-mentioned equation (2) for cell j is subtracted from cell i, the following equation is obtained:

$$-T_{TxSFN}(i) + T_{TxSFN}(j) = T_m(i) - T_m(j) + T_p(i) - T_p(j) \qquad (3)$$

This equation can be rewritten as:

$$T_p(i, j) = T_m(i, j) + T_{TxSFN}(i, j) \qquad (4)$$

where the operator X(i, j)=X(i)−X(j) represents a difference of values so that X(i, j)=−X(j, i). The term T$_{TxSFN}$(i, j) is usually referred as the Relative Time Difference (RTD) between the transmissions of the measured cells. As UMTS is an unsynchronized network, such time difference is not known. RTDs can be calculated by a location measurement unit 40 or estimated using one of the different techniques known in the art and which will be explained further below.

The propagation distance difference in meters can be expressed in terms of the propagation time difference in chips by the following equation:

$$d_p(j, i) = \rho \cdot T_p(j, i) \qquad (5)$$

With the use of equation (4), this equation can be rewritten as:

$$d_p(j, i) = \rho \cdot (T_m(i, j) + T_{TxSFN}(i, j)) \qquad (6)$$

Where T$_m$(i, j) is the T$_m$ difference calculated from the T$_m$ values included in the RRC measurement reports collected at the OSS, and T$_{TxSFN}$(i, j) is the relative time difference or time delay difference either obtained from a location measurement unit 40 or estimated.

As can be deduced from FIG. 3, from a geometric perspective, the propagation distance difference can be expressed in Cartesian coordinates as follows:

$$d_p(j,i) = \sqrt{(x_0-x_j)^2 + (y_0-y_j)^2} - \sqrt{(x_0-x_i)^2 + (y_0-y_i)^2} \qquad (7)$$

where (x$_0$, y$_0$), (x$_i$, y$_i$) and (x$_j$, y$_j$) are the coordinates of the UE and of cell i and j, respectively. As shown in FIG. 3, the geometric plot of equation (6) is a hyperbola that represents the difference of propagation distances between the UE and the two cells which are located at the focal points. By definition, in a hyperbola such difference of distances cannot exceed the separation between the focal points, which is equivalent to the inter-site or inter-cell distance (ISD) between cell i and cell j. In the following this inter-cell distance will be expressed as D$_{i,j}$. Thus, the propagation distance difference describing the distance difference relating to the RF signals travelling between the two cells and the mobile entity is defined as follows:

$$|d_p(j,i)| \leq D_{i,j} \qquad (8)$$

where D$_{i,j}$ is the inter-cell distance between the two cells calculated by the following equation:

$$D_{i,j} = \sqrt{(x_i-x_j)^2 + (y_i-y_j)^2} \qquad (9)$$

The cell location data of cell coordinates may be obtained from configuration management data at the OSS.

Figure 5:
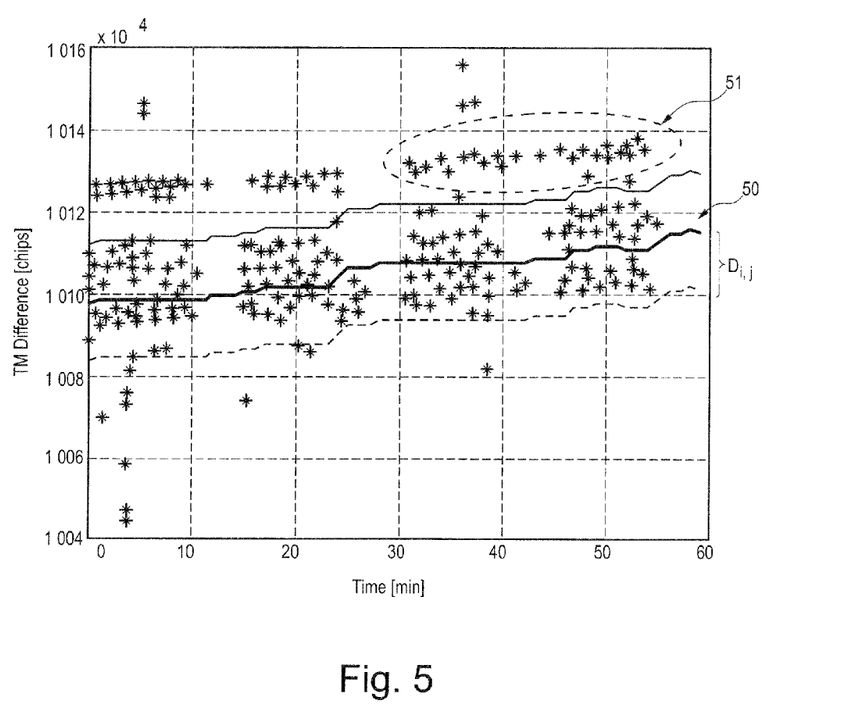
FIG. 5 is a schematic example of a distribution of differences of a $T_m$ parameter over time.

FIG. 5 shows different examples for T$_m$ differences over time. FIG. 5 shows the inter-cell distance D$_{i,j}$ with graph 50 indicating the time T$_{TxSFN}$(j, i). As shown in FIG. 5, the T$_m$ differences are confined to a region centered in the Relative Time Difference. If the T$_m$ difference is out of such region, the mathematical conditions for the equation to be a hyperbola are not fulfilled. This is an indication that one of the measurements is likely to be suffering from multipath as indicated by the measurements 51.

It is possible to define a multipath offset in meters for a given distance difference, i.e. a propagation distance difference determined by the T$_m$ difference that measures how severe the multipath is. The definition is as follows:

$$M_{off}(i, j) = \begin{cases} d_p(j, i) - D_{i,j} & \text{if } d_p(j, i) > D_{i,j} \\ d_p(j, i) + D_{i,j} & \text{if } d_p(j, i) < -D_{i,j} \\ 0 & \text{otherwise} \end{cases} \qquad (10)$$

This means that if the multipath offset M$_{off}$ is positive, the path from the j cell propagates a longer distance than the path from cell i, which indicates that the former, cell j, suffers from a stronger multipath.

The main steps discussed above can be summarized as follows. Cell location information for a plurality of cells is obtained, e.g. at a data gateway from the OSS. Furthermore, at least one time delay measurement report such as an RRC measurement report containing a time delay measurement parameter such as T$_m$ is obtained for each of the at least two cells. For each couple of the cells a T$_m$ difference "T$_m$(i, j)" is calculated between the first cell i and the second cell j as the difference between the T$_m$ parameters for the first cell and the T$_m$ parameter for the second cell. Furthermore, a relative time difference "T$_{TxSFN}$(i, j)" between the first cell i and the second cell j is determined as a difference between the system frame number SFN transmit time T$_{TxSFN}$W of the first cell and the SFN transmit time T$_{TxSFN}$(j) of the second cell j. The time delay difference is then converted into a distance difference or propagation distance difference d$_p$(j, i) between the second cell j and the first cell i by multiplying the $T_m$ difference $T_m(i, j)$ and the relative time difference $T_{TxXFN}(i, j)$ by a constant value. Furthermore, the inter-cell distance $D_{i,j}$ is determined between the first cell and the second cell based on the received cell location information and it is determined whether multipath propagation exists by comparing the propagation distance difference $d_p(j, i)$ and the inter-site distance $D_{i,j}$. If the absolute value of the propagation distance difference $d_p(j, i)$ is lower than the inter-site distance $D_{i,j}$, there is no evident multipath propagation. If the absolute value of the propagation distance difference $|d_p(j,i)|$ is higher than the inter-site distance $D_{i,j}$ and the propagation distance difference $d_p(j, i)$ is positive, the path propagation from cell j is longer than the one from cell i, and if the absolute value of the propagation difference $d_p(j, i)$ is higher than the inter-site distance $D_{i,j}$ and the propagation distance difference $d_p(j, i)$ is negative, the path propagation from the first cell i is longer than the one from the second cell.

The values of $T_{TxSFN}(i, j)$ can be determined by receiving the SFN transmit time $T_{TxSFN}(i)$ and $T_{TxSFN}(j)$ of the first and the second cell, respectively from a location measurement unit LMU. Alternatively, the determination of $T_{TxSFN}(i, j)$ comprises the step of obtaining a plurality of RRC measurement reports containing $T_m$ parameters for the first and second cells and by calculating a $T_m$ difference $T_m(i, j)$ as the difference between the $T_m$ parameter for the first cell and the $T_m$ parameter for the second cell in each measurement report and estimating the $T_{TxSFN}(j)$ as a median of all $T_m$ differences.

As mentioned above, UMTS is an unsynchronized network, so that the RTD between each pair of cells is not known. In case the network does not have any LMU, such RTDs can also be estimated. Equation (10) indicates that the $T_m$ difference must fall in a region centered in the RTD and limited by the inter-site or inter-cell distance. A possible way of estimating $T_{TxSFN}(i, j)$ is by collecting a statistically relevant amount of RRC measurement reports that measure cells j and i as described below:

$$T_{TxSFN}(i, j) = -T_{TxSFN}(j, i) \approx -M(T_{m,k}(i, j))$$
$$k=1, \ldots, N_{i,j} \qquad (11)$$

where M is the median operator, $T_{m,k}(i, j)$ is the k-th $T_m$ difference measuring cell i and j, and $N_{i,j}$ is the number of RRC measurement reports including such pair of cells. It is worth mentioning that RTDs may oscillate over time. In that case, the RTD should be estimated as a function of time, for instance, considering short periods of time.

Figure 6:
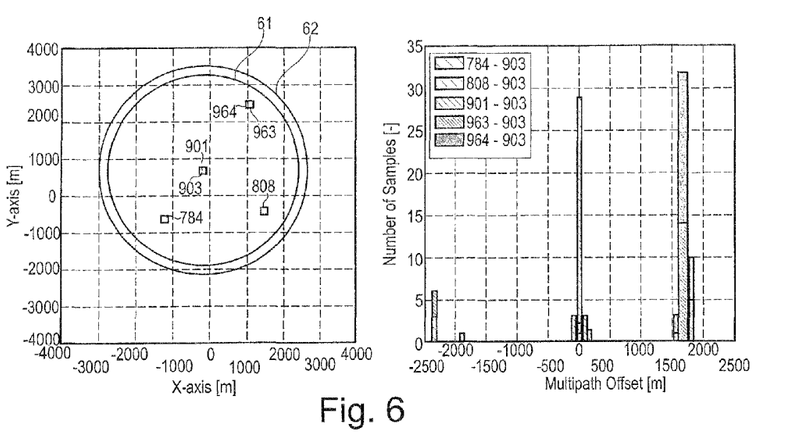
FIG. 6 schematically illustrates a call from a mobile entity in which multipath propagation is present.
Figure 7:
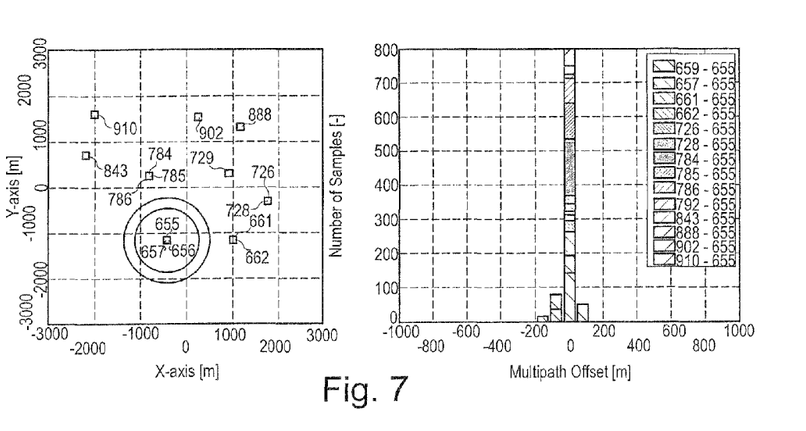
FIG. 7 schematically illustrates a call where no evident multipath propagation could be detected.

FIGS. 6 and 7 show a possible usage of the multipath offset. A mobile entity reports the propagation delay PD that indicates the time that the signal requires for travelling from the serving cell to the UE at least every time a call is established, the PD being quantizied in three chip units with one chip corresponding to 78 m, so that the PD range is around 234 m. This value is used in positioning algorithms or troubleshooting, etc. As a time measurement is prone to multipath and if a time measurement suffers from multipath, this measurement should be discarded from any kind of analysis. The above-discussed method can now reliably detect multipath propagation using a difference in the $T_m$ values. In the left part of FIG. 6 all cells are plotted that have been included in an RRC measurement report during a certain call. At call establishment, the mobile entity was connected to cell 903 reporting a PD of 11 units. This means a range between 2574 m and 2808 m. This is represented by the two circles 61 and 62. The range limited by a propagation delay should indicate the area where the call took place. The right part of FIG. 6 now shows the multipath offset distribution for each cell that was also measured together with the cell number 903, i.e. #903, in other words the multipath of offset $M_{off}(i, j)$ is shown, where j=#903. Results indicate that more than 55% of the samples were reported with a positive multipath offset. As discussed above, if the multipath is positive, cell j propagates longer than cell i and hence cell j is likely to suffer from multipath propagation. As cell j corresponds to cell #903, i.e. the one associated to PD, it can be concluded that PD is also suffering from multipath and should not be used. This reasoning is visually corroborated by the fact that in FIG. 6 in the left picture the PD range is out of the expected coverage area from the measured cells.

FIG. 7 shows another example but now there is no evidence of multipath. In this case the mobile entity was connected to cell #655 reporting a PD of 3 units corresponding to a range between 702 m and 936 m. The multipath offset $M_{off}(i, j)$, where j=#655, distribution indicates that a large amount of the samples, i.e. more than 90% were reported with no offset, so that no multipath propagation is expected. This conclusion agrees with the right part of the FIG. 7, where the reported PD keeps within the zone of influence of the measures cells.

Figure 8:
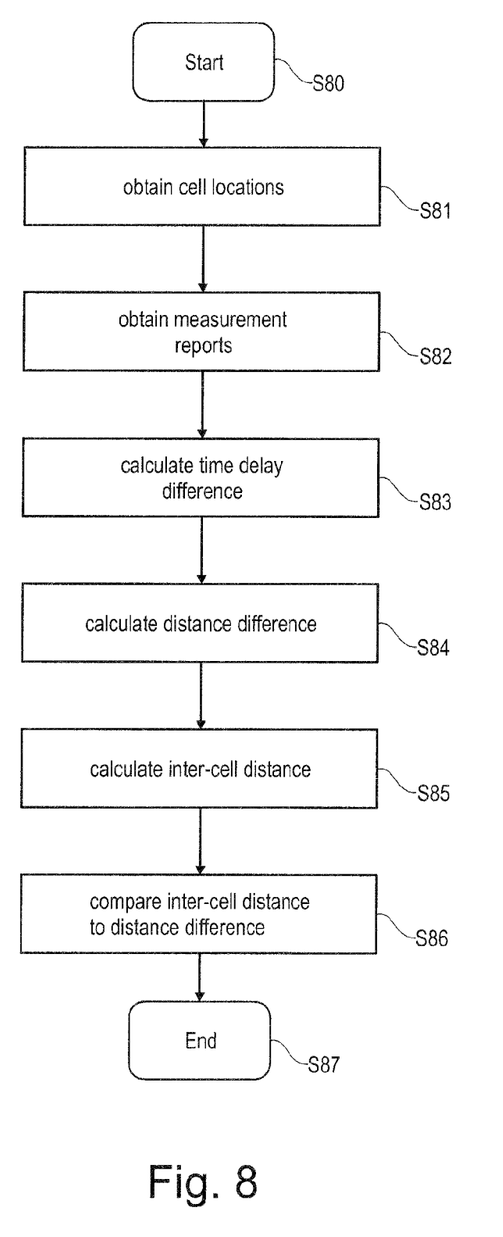
FIG. 8 is a flowchart comprising the steps carried out to detect multipath propagation.

FIG. 8 now summarizes the main steps carried out for determining whether multipath propagation is present in a signal exchanged between the mobile entity and different cells of a cellular network. The method starts in step S80. According to one step of the method, the cell locations are obtained in step S81. As discussed above, the cell locations may be retrieved from the OSS. However, it should be understood that the cell locations may be obtained from other sources. The cell locations will be used later on for calculating the inter-cell distance. In step S82 measurement reports are obtained, such as RRC measurement reports. The measurement reports are received for at least two different cells and contain a time delay parameter for each of the at least two different cells which depends on the travel time needed for the RF signal to travel between a cell, i.e. a transceiver of a cell, and a mobile entity. In the embodiment described above, this parameter is the parameter $T_m$. However, it should be understood that any other parameter provided by the cellular network can be used which has a predefined relationship with the travel time of the RF signal between the mobile entity and the corresponding cell. In step S83 a time delay difference is calculated by determining a relative time difference between a time delay for the first cell and a time delay for the second cell. In step S84, this time delay difference is converted into distance difference using the speed of the RF signals. Additionally, in step S85 the inter-cell distance is determined using the cell location information obtained in step S81. By comparing in step S86 the inter-cell distance to the calculated distance difference of S84, multipath propagation can be detected reliably for the signals exchanged between the mobile entity and the pair of cells considered. The method ends in step S87.

Figure 9:
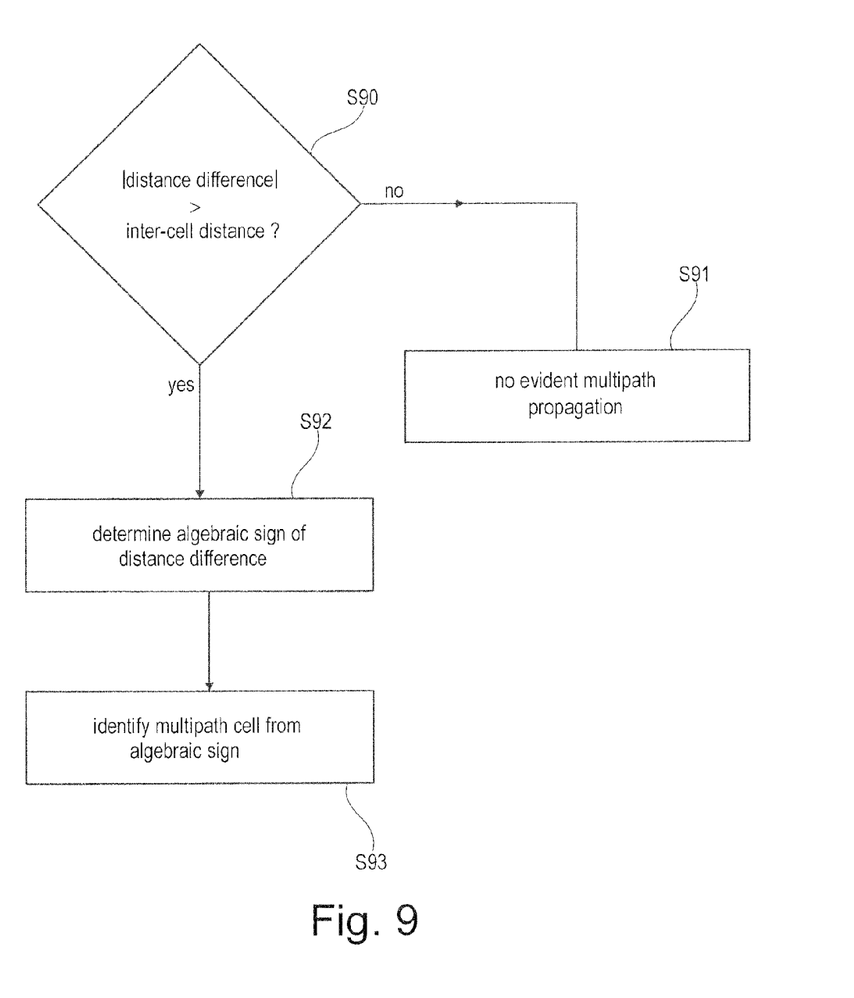
FIG. 9 shows a flowchart illustrating further details of the multipath detection.

FIG. 9 provides a more detailed view of how the occurrence of a multipath is detected in step S86. The steps shown in FIG. 9 indicate which steps might be carried out in order to determine the presence of a multipath propagation. In step S90 it is determined whether the absolute value of the distance difference is larger than the inter-cell distance. If this is not the case, multipath can hardly occur, so that it can be deduced that no evident multipath is present in the signal propagation of the considered cells. If, however, the absolute value of the distance difference is larger than the inter-cell distance, the algebraic sign of the distance difference can be determined in step S92. By way of example if the distance difference is positive, it means that the subtrahend deduced from the minuend is smaller, so that the path propagation from the minuend, i.e. the first cell, is longer than from the subtrahend. If the difference is negative, it can be deduced that the minuend is smaller than the subtrahend. Thus, the path of the cell to the mobile entity represented by the minuend is smaller than the path represented by the subtrahend. Accordingly, the subtrahend path is longer than the minuend path, so that multipath propagation may be present in the path represented by the subtrahend. Thus, summarizing in step S93 from the algebraic sign the cell can be identified in which multipath is present.

Figure 2:
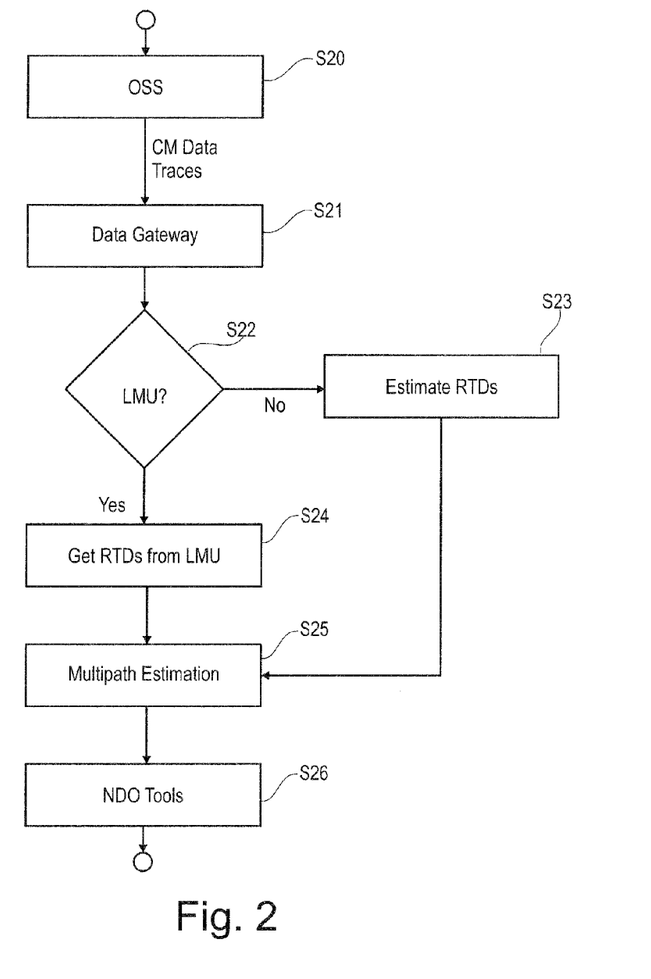
FIG. 2 shows a flowchart for illustrating a method in which a detected multipath propagation according to an embodiment of the invention is used to improve positioning methods used by a network design and optimization (NDO) tool.

FIG. 2 gives a further overview over a method how the results of the detection of multipath propagation can be used. In step S20 configuration management data are retrieved from the OSS in order to get the cell location and the RRC measurement reports. The measurement reports and the cell location data are transmitted in step S21 to a data gateway where the data are processed in order to retrieve the needed information. From the data gateway the needed information is then passed on to the module which determines the multipath propagation. This module can be a stand-alone node in the cellular network; however, this module can also be incorporated in any other node of the cellular network, e.g. in the OSS (Operations Support System) or NDO (Network Design and Operation). It is then checked in step S22 whether a location measurement unit is present. If this is not the case, the relative time difference RTD is estimated (step S23). If a location measurement unit is present, the RTDs may be received from LMU, e.g. LMU 40 of FIG. 3 (step S24). Using the RTDs, the inter-cell distance and the $T_m$ values, the multipath propagation can be detected and its value can be estimated in step S25. The information which measurement reports are affected by multipath propagation is then forwarded to the NDO tool in order to improve positioning algorithms or to improve troubleshooting and RF optimization (step S26).

From the above discussion some generalized conclusions can be drawn:

If an absolute value of the distance difference is larger than the inter-cell distance, it can be concluded that multipath propagation is present, wherein if the absolute value of the distance difference is smaller than the cell distance, it can be concluded that no evident multipath propagation is present.

Furthermore, it can be deduced from an algebraic sign of the distance difference whether the multipath propagation is present in the propagation between the first cell and the mobile entity or between the second cell and the mobile entity.

When the cellular network is an asynchronous network, a first synchronization time parameter is determined for the first cell and the second synchronization time parameter is determined for the second cell. Additionally, a synchronization time difference is determined between the two synchronization parameters and the distance difference is calculated taking into account the synchronization time difference.

The synchronization time difference can be received from a local measurement node of the cellular network, in another embodiment the synchronization time difference may be estimated based on a set of measurement reports.

When it is detected whether multipath is present in a signal exchange from a mobile entity to a first or second cell, the first synchronization time parameter for the first cell and the second synchronization time parameter for the second cell may be received from the location measurement node.

Additionally, the parameter related to the first time delay and the parameter related to the second time delay may be deduced from radio resource control measurement reports transmitted from the mobile entity to the cellular network.

The parameter related to the first time delay and the parameter related to the second time delay are both $T_m$ parameters defined by the equation $T_m=T_{UETx}-T_0-T_{RxSFN}$, with $T_{UETx}$ being a time when the mobile entity transmits an Uplink Dedicated Physical Channel, $T_{RxSFN}$ being a time at which the mobile entity receives a Primary Common Control Physical Channel frame most recent in time before the time instant $T_{UETx}-T_0$, and $T_0$ being a constant.

Furthermore, it is possible to determine a relative time difference between the first cell and the second cell as the difference between a system frame number SFN transmit time of the first cell and a system frame number SFN transmit time of the second cell. The distance difference can then be calculated by multiplying the addition of the time delay difference and the relative time difference by a constant value.

Figure 10:
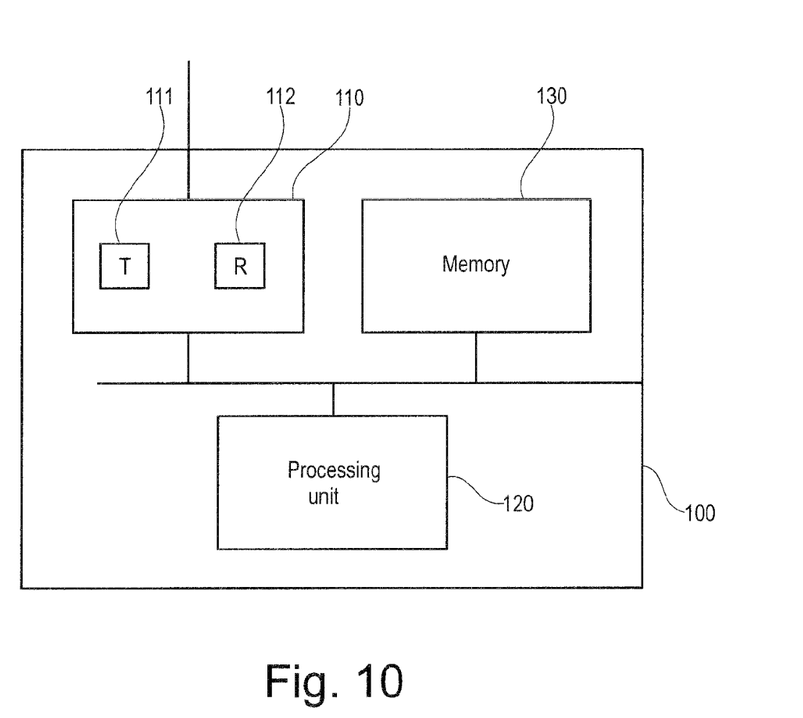
FIG. 10 schematically illustrates the structures of a system for detecting multipath propagation.

FIG. 10 illustrates a schematic view of a system or module which is capable of detecting multipath propagation. The system comprises an interface 110 for communication with any other nodes of the cellular network, inter alia for communication with the gateway for obtaining the time delay parameters and cell location data and to provide the result of the multipath detection to an NDO tool. The interface 110 includes a transmitter 111 to transmit data to other entities, the receiver 112 being provided to receive data from other entities. The system furthermore comprises a processing unit 120 including one or more processors coupled to the interface 110 and to a memory 130. The memory may include a read-only memory, a random access memory, a dynamic RAM or static RAM, a mass storage or the like. The memory 130 includes a suitable configured program code to be executed by the processing unit so as to implement the above-described functionalities of the system 100. In particular, the memory 130 may include various program code modules for causing the system to perform processes as described above.

It is to be understood that the structures as illustrated are merely schematic and that the system 100 may include further components which, for the sake of clarity, have not been illustrated. Furthermore, it is to be understood that the system may include further types of modules needed for implementing other functionalities. A computer program may be provided in the memory for implementing functionalities of the system 100, e.g. in the form of a physical medium storing the program code and/or other data to be stored in the memory or by making the program code available for download or by streaming. Furthermore, the different functional modules shown in FIG. 10 may be incorporated by hardware or software or a combination of hardware and software.

The above-described invention has the following advantages:

Multipath is detected based on standardized time delay measurements which are already collected at the OSS operators to be used for instance in OTDOA positioning. Thus, there is no need of activating any new feature in the base station or radio access network part of the network. As a consequence, the proposed invention provides a cost-effective solution for determining multipath. Furthermore, most of the required calculations, such as the $T_m$ differences or RTD estimation, are part of the OTDOA positioning, which minimizes the increase of computational costs due to the implementation of the multipath detection calculations.

The proposed approach is also a versatile solution that can be easily adapted to multiple applications described below.

Enhancement of OTDOA positioning: OTDA is characterized by solving a nonlinear system of equations, where each of them corresponds to the $T_m$ difference between to measured cells. Including a $T_m$ difference suffering from multipath will make more likely the solution to diverge, and it should not be considered.

Strengthen of PD-based positioning: PD measurements are used in positioning algorithms as a reference of the distance to the serving cell. If time-delay measurements from such cell suffer from multipath is likely that the PD value too, and hence, it should be discarded.

RF Troubleshooting and optimization: calls detected with high multipath should be analyzed from RF perspective, e.g. the presence of buildings and other objects that may block the line of sight and cause multipath that may degrade the network performance. RF environment performance and call termination versus multipath can help operators take actions related to RF design and optimization, such a tilt or azimuth changes, or even adding new cells to facilitate the line of sight.

The invention claimed is:

1. A method for detecting multipath propagation in RF signals exchanged between a mobile entity and different cells of a cellular network, comprising the steps of:
   obtaining cell location information for a plurality of cells,
   obtaining a measurement report reported by the mobile entity to the cellular network for a first cell and a second cell of the plurality of cells, the measurement report comprising a parameter related to a first time delay occurring for the RF signal travelling between the first cell and the mobile entity and a parameter related to a second time delay occurring for the RF signal travelling between the second cell and the mobile entity,
   calculating a time delay difference between the first time delay and the second time delay,
   calculating a distance difference from the time delay difference taking into account the speed of the RF signals travelling between the first cell and the mobile entity and between the second cell and the mobile entity,
   calculating an inter-cell distance between the first cell and the second cell based on the cell location information for the first cell and the second cell, and
   comparing the inter-cell distance to the distance difference, wherein the multipath propagation is detected based on the result of the comparison.

2. The method according to claim 1, wherein if an absolute value of the distance difference is larger than the inter-cell distance, it is concluded that multipath propagation is present, wherein if the absolute value of the distance difference is smaller or equal than inter-cell distance, it is concluded that no multipath propagation is present.

3. The method according to claim 1, wherein it is deduced from an algebraic sign of the distance difference whether the multipath propagation is present in the propagation between the first cell and the mobile entity or between the second cell and the mobile entity.

4. The method according to claim 1, wherein the cellular network is an asynchronous network, further comprising the step of determining a first synchronization time parameter for the first cell and a second synchronization time parameter for the second cell, wherein a synchronization time difference is determined between the two synchronization parameters, and the distance difference is calculated taking into account the synchronization time difference.

5. The method according to claim 4, wherein the synchronization time difference is received from a location measurement node of the cellular network.

6. The method according to claim 4, wherein the first synchronization time parameter and the second synchronization time parameter are received from a location measurement node of the cellular network.

7. The method according to claim 1, wherein the parameter related to the first time delay and the parameter related to the second time delay are deduced from Radio Resource Control measurement reports transmitted from the mobile entity to the cellular network.

8. The method according to claim 1, wherein the parameter related to the first time delay and the parameter related to the second time delay are both a Tm parameter defined by the equation:

$$T_m = T_{UETx} - T_0 - TR_{xSFN}, \text{ with}$$

$T_{UETx}$ being a time when the mobile entity transmits an uplink Dedicated Physical Channel, $T_{RxSFN}$ being a time at which the mobile entity receives a primary common control channel frame most recent in time before the time instant $T_{UETx} - T_0$, and $T_0$ being a constant.

9. The method according to claim 1, further comprising a step of determining a relative time difference between the first cell and the second cell as the difference between a system frame number "SFN" transmit time of the first cell and an SFN transmit time of the second cell.

10. The method according to claim 9, wherein the distance difference is calculated by multiplying the addition of the time delay difference and the relative time difference by a constant value.

11. A computer program comprising program code to be executed by at least one processor of a system of a cellular network, wherein execution of the program causes the at least one processor to perform steps of a method according to claim 1.

12. A computer program product comprising program code to be executed by at least one processor of a system of a cellular network, wherein execution of the program causes the at least one processor to perform steps of a method according to claim 1.

13. A system configured to detect multipath propagation in RF signals exchanged between a mobile entity and different cells of a cellular network, comprising:
   a receiver configured to receive cell location information for a plurality of cells, a measurement report reported by the mobile entity to the cellular network for a first cell and a second cell of the plurality of cells, the measurement report comprising a parameter related to a first time delay occurring for the RF signal travelling between the first cell and the mobile entity and a parameter related to a second time delay occurring for the RF signal travelling between the second cell and the mobile entity,
   a processor configured to calculate a time delay difference between the first time delay and the second time delay, to calculate a distance difference from the time delay difference taking into account the speed of the RF signals travelling between the first cell and the mobile entity and between the second cell and the mobile entity, to calculate an inter-cell distance between the first cell and the second cell based on the cell location information for the first cell and the second cell, and to compare the inter-cell distance to the distance difference, wherein the processor is configured to detect the multipath propagation based on the result of the comparison.

14. The system according to claim 13, wherein the processer is configured to determine an absolute value of the distance difference, wherein if the processor determines that the absolute value is larger than the inter-cell distance it concludes that multipath propagation is present, wherein if the processor determines that the absolute value of the propagation distance is smaller or equal than the inter-cell distance it concludes that no multipath propagation is present.

15. The system according to claim 13, wherein the processor is configured to deduce from an algebraic sign of the distance difference whether the multipath propagation is present in the propagation between the first cell and the mobile entity or between the second cell and the mobile entity.

16. The system according to claim 13, wherein the cellular network is an asynchronous network, wherein the processor is configured to determine a first synchronization time parameter for the first cell and a second synchronization parameter for the second cell, to determine a synchronization time difference between the two synchronization parameters, and to calculate the distance difference taking into account the synchronization time difference.

17. The system according to claim 13, wherein the processor is configured to determine a relative time difference between the first cell and the second cell as the difference between a system frame number "SFN" transmit time of the first cell and an SFN transmit time of the second cell.

18. The system according to claim 17, wherein the processor is configured to calculate the distance difference by multiplying the addition of the time delay difference and the relative time difference by a constant value.

* * * * *